US009213804B2

(12) United States Patent
Barnes et al.

(10) Patent No.: US 9,213,804 B2
(45) Date of Patent: Dec. 15, 2015

(54) SECURING DISPLAYED INFORMATION

(75) Inventors: James W. Barnes, Creedmoor, NC (US);
Vasantha K. Alle, Morrisville, NC (US);
Devang Patel, Cary, NC (US); Ryan R. Wilson, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 685 days.

(21) Appl. No.: 13/363,666

(22) Filed: Feb. 1, 2012

(65) Prior Publication Data
US 2013/0198850 A1 Aug. 1, 2013

(51) Int. Cl.
| G06F 21/00 | (2013.01) |
| G06F 12/14 | (2006.01) |
| H04L 29/06 | (2006.01) |
| H04M 1/725 | (2006.01) |
| H04L 29/08 | (2006.01) |
| G06F 3/0488 | (2013.01) |
| G06F 12/08 | (2006.01) |
| H04M 3/42 | (2006.01) |
| H04L 12/18 | (2006.01) |
| G08B 21/02 | (2006.01) |
| G06Q 10/10 | (2012.01) |
| G06F 17/40 | (2006.01) |

(52) U.S. Cl.
CPC ............ *G06F 21/00* (2013.01); *G06F 3/0488* (2013.01); *G06F 12/0808* (2013.01); *G06Q 10/10* (2013.01); *G08B 21/0213* (2013.01); *H04L 12/1827* (2013.01); *H04L 63/0492* (2013.01); *H04L 67/14* (2013.01); *H04L 67/22* (2013.01); *H04L 67/24* (2013.01); *H04M 1/7253* (2013.01); *H04M 3/42221* (2013.01); *G06F 2221/2143* (2013.01); *H04L 2209/88* (2013.01)

(58) Field of Classification Search
CPC .......... G06F 2221/2143; G06F 3/0488; G06F 2221/2111; G06F 12/0808; G06F 21/00; H04L 63/0492; H04L 67/14; H04L 12/1827; H04L 2209/88; H04L 67/22; H04L 67/24; H04N 7/147; H04N 7/15; G06Q 10/10; H04M 1/7253; H04M 3/42221; G08B 21/0213
USPC .................................... 726/26; 345/156, 179
See application file for complete search history.

(56) References Cited

U.S. PATENT DOCUMENTS

| 5,790,114 | A | 8/1998 | Geaghan et al. | |
| 5,825,880 | A * | 10/1998 | Sudia et al. | 713/180 |
| 7,109,979 | B2 | 9/2006 | Moyne et al. | |
| 7,219,233 | B1 * | 5/2007 | Hendriks et al. | 713/182 |
| 2001/0037407 | A1 * | 11/2001 | Dragulev et al. | 709/250 |
| 2002/0013898 | A1 * | 1/2002 | Sudia et al. | 713/155 |
| 2002/0113773 | A1 | 8/2002 | McDonnell et al. | |
| 2002/0133611 | A1 * | 9/2002 | Gorsuch et al. | 709/231 |
| 2003/0204526 | A1 * | 10/2003 | Salehi-Had | 707/104.1 |

(Continued)

*Primary Examiner* — Michael Simitoski
(74) *Attorney, Agent, or Firm* — Paul S. Drake

(57) ABSTRACT

A method, system or computer usable program product for securing displayed information including establishing a session between a first data processing device including a first memory and a second data processing device including a second memory and a display, maintaining session awareness indicating that both the first and second devices are alive in the session, inputting information into the second data processing device during the session producing input information stored in the second memory, and responsive to a determination the session has ended between the first and second device, deleting the input information in the second memory.

22 Claims, 7 Drawing Sheets

(56) References Cited

U.S. PATENT DOCUMENTS

| | | |
|---|---|---|
| 2004/0070616 A1 | 4/2004 | Hildebrandt et al. |
| 2004/0249899 A1* | 12/2004 | Shiigi ............................. 709/206 |
| 2004/0249953 A1* | 12/2004 | Fernandez et al. ............. 709/227 |
| 2005/0091338 A1* | 4/2005 | de la Huerga ................. 709/217 |
| 2005/0193060 A1* | 9/2005 | Barton ........................... 709/204 |
| 2005/0223222 A1* | 10/2005 | Graves et al. .................. 713/165 |
| 2005/0276270 A1* | 12/2005 | Buinevicius et al. ........ 370/395.5 |
| 2006/0199537 A1* | 9/2006 | Eisenbach ..................... 455/41.2 |
| 2006/0211404 A1 | 9/2006 | Cromp et al. |
| 2006/0259923 A1 | 11/2006 | Chiu |
| 2007/0050479 A1* | 3/2007 | Yoneda .......................... 709/219 |
| 2007/0155322 A1 | 7/2007 | Wang et al. |
| 2007/0172047 A1* | 7/2007 | Coughlan et al. ......... 379/202.01 |
| 2007/0216660 A1* | 9/2007 | Sposato et al. ................ 345/173 |
| 2007/0297609 A1* | 12/2007 | Adams et al. ................. 380/270 |
| 2008/0192059 A1* | 8/2008 | Kennedy ........................ 345/537 |
| 2008/0256189 A1* | 10/2008 | Lyle et al. ..................... 709/206 |
| 2009/0106376 A1* | 4/2009 | Tom et al. ..................... 709/206 |
| 2009/0244278 A1* | 10/2009 | Taneja et al. .................. 348/143 |
| 2009/0286477 A1 | 11/2009 | Braun |
| 2009/0287928 A1 | 11/2009 | Braun |
| 2010/0019920 A1* | 1/2010 | Ketari ......................... 340/686.6 |
| 2010/0031349 A1* | 2/2010 | Bingham ......................... 726/20 |
| 2010/0042647 A1* | 2/2010 | Schultz et al. ............. 707/104.1 |
| 2010/0132034 A1* | 5/2010 | Pearce et al. .................... 726/19 |
| 2010/0186078 A1* | 7/2010 | Napoli et al. ..................... 726/9 |
| 2010/0199340 A1* | 8/2010 | Jonas et al. ....................... 726/8 |
| 2010/0220846 A1 | 9/2010 | Gisby et al. |
| 2010/0245563 A1* | 9/2010 | Golovchinsky et al. ...... 348/135 |
| 2010/0281223 A1* | 11/2010 | Wolfe et al. ................... 711/133 |
| 2010/0318813 A1* | 12/2010 | Carrico et al. ................. 713/194 |
| 2011/0055891 A1* | 3/2011 | Rice ................................. 726/2 |
| 2012/0062591 A1* | 3/2012 | Omura et al. .................. 345/629 |
| 2012/0117636 A1* | 5/2012 | Adams .............................. 726/9 |
| 2012/0293599 A1* | 11/2012 | Norlin et al. ................. 348/14.01 |
| 2013/0198653 A1* | 8/2013 | Tse et al. ....................... 715/751 |

\* cited by examiner

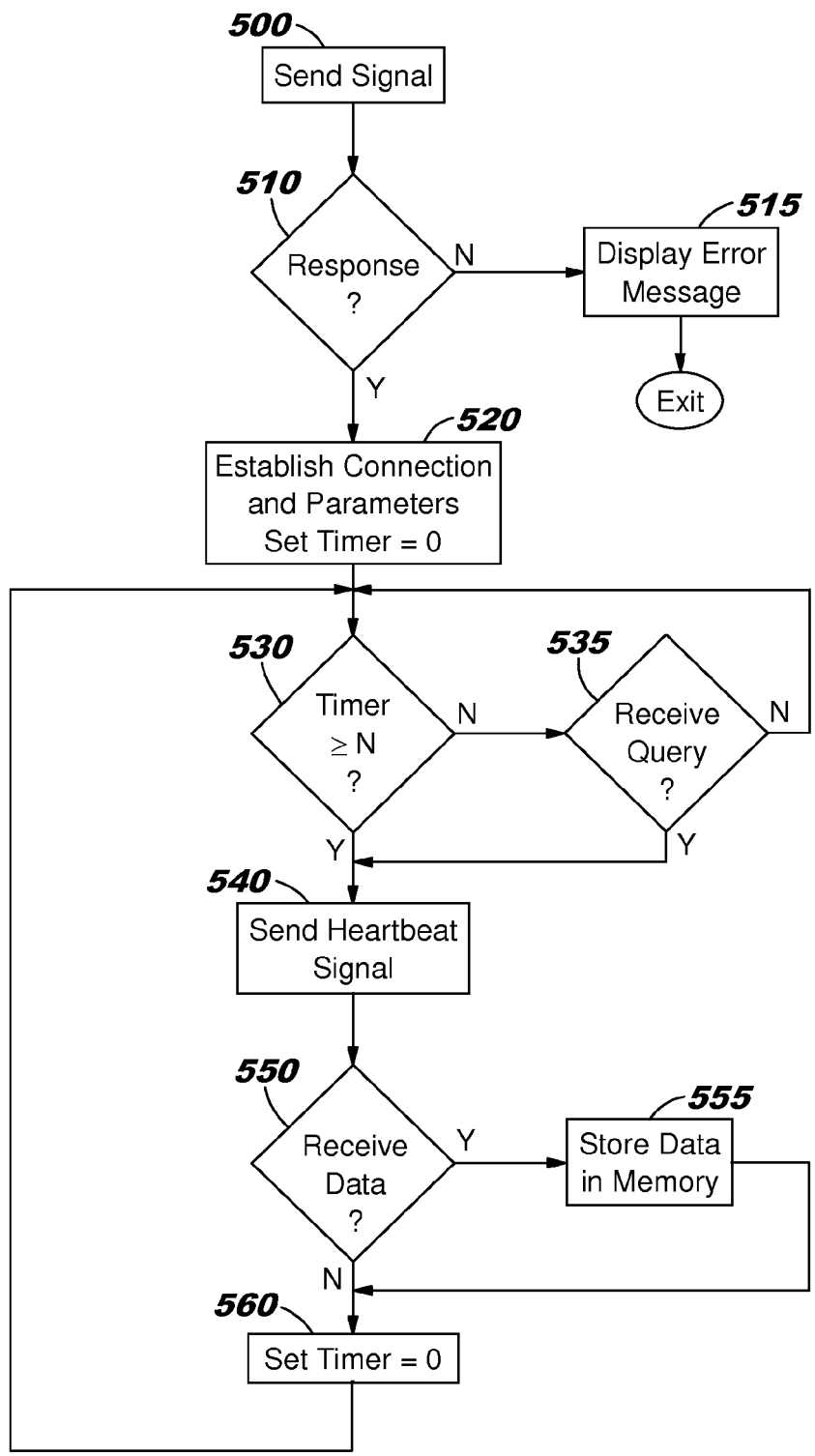

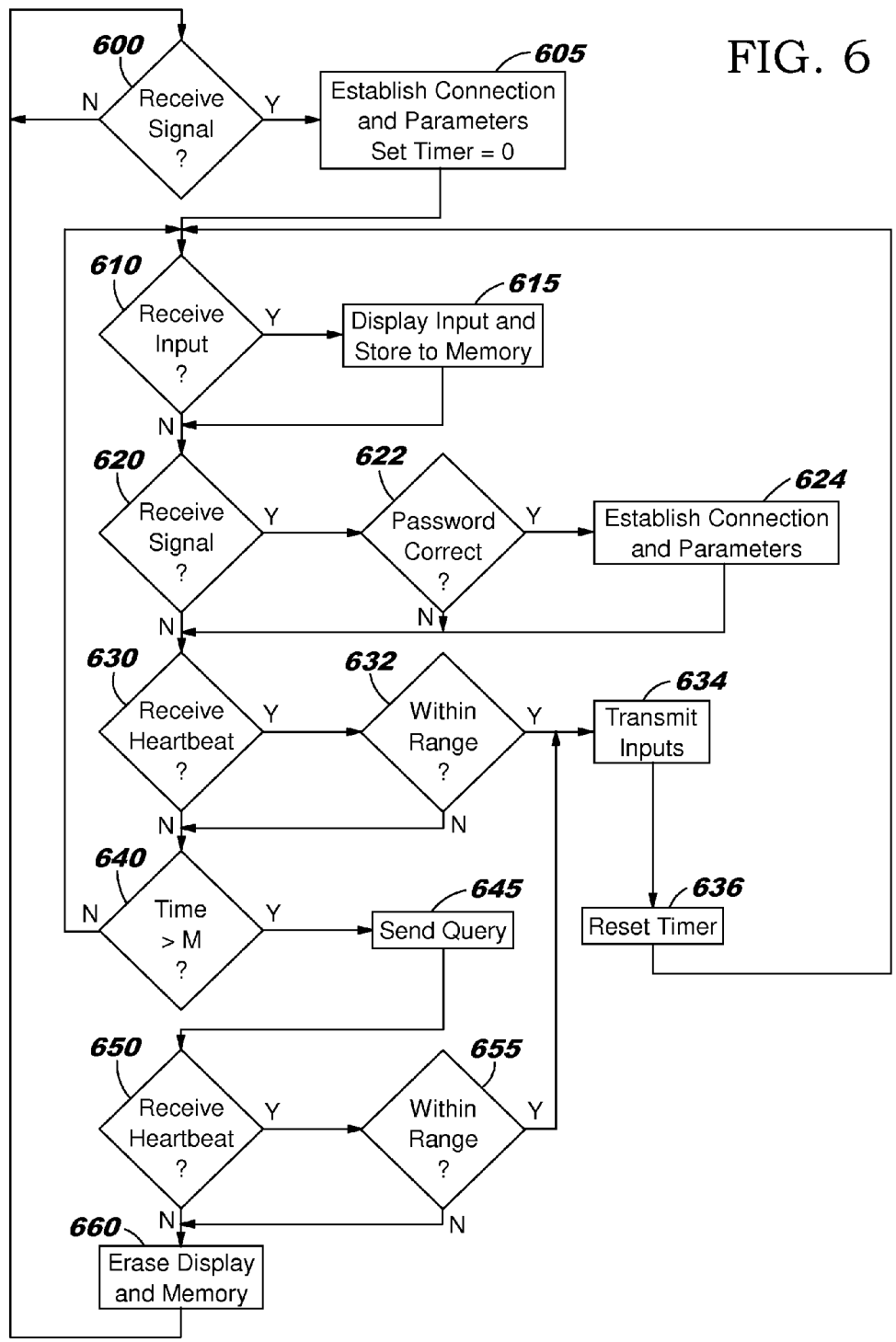

FIG. 7A

| Whiteboard Identifier | *700* |
|---|---|
| Password | *710* |
| Input Data | *720* |

FIG. 7B

| Laptop Identifier | *750* |
|---|---|
| Password | *760* |
| GPS Location | *770* |

SECURING DISPLAYED INFORMATION

BACKGROUND

1. Technical Field

The present invention relates generally to securing displayed information, and in particular, to a computer implemented method for securing displayed information shared between multiple devices.

2. Description of Related Art

Sensitive information is often shared or even created in group settings. These settings may be within a fairly secure environment such as within the facilities of an enterprise. These settings may also be in less secure settings, such as in a hotel conference room. In either case, the information being shared or created may not be appropriate for viewing by anyone with access to that setting. As a result, enterprises often implement clean desk and clean room policies to make sure sensitive information is not shared inappropriately. However, especially with group settings, often such information may be left in the open inadvertently.

SUMMARY

The illustrative embodiments provide a method, system, and computer usable program product for securing displayed information including establishing a session between a first data processing device including a first memory and a second data processing device including a second memory and a display, maintaining session awareness indicating that both the first and second devices are alive in the session, inputting information into the second data processing device during the session producing input information stored in the second memory, and responsive to a determination the session has ended between the first and second device, deleting the input information in the second memory.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 5 is a flowchart illustrating the operation of a laptop in accordance with a first or second embodiment;

FIG. 6 is a flowchart illustrating the operation of a whiteboard in accordance with a second embodiment; and FIG. 7A is a block diagram of a communication that may be sent from the whiteboard to the laptop in accordance with the first or second embodiment; and FIG. 7B is a block diagram of a heartbeat communication that may be sent from the laptop to the whiteboard in accordance with the first or second embodiments.

DETAILED DESCRIPTION

Steps may be taken to secure displayed information shared between multiple devices. These steps may be taken as will be explained with reference to the various embodiments below.

Figure 1:
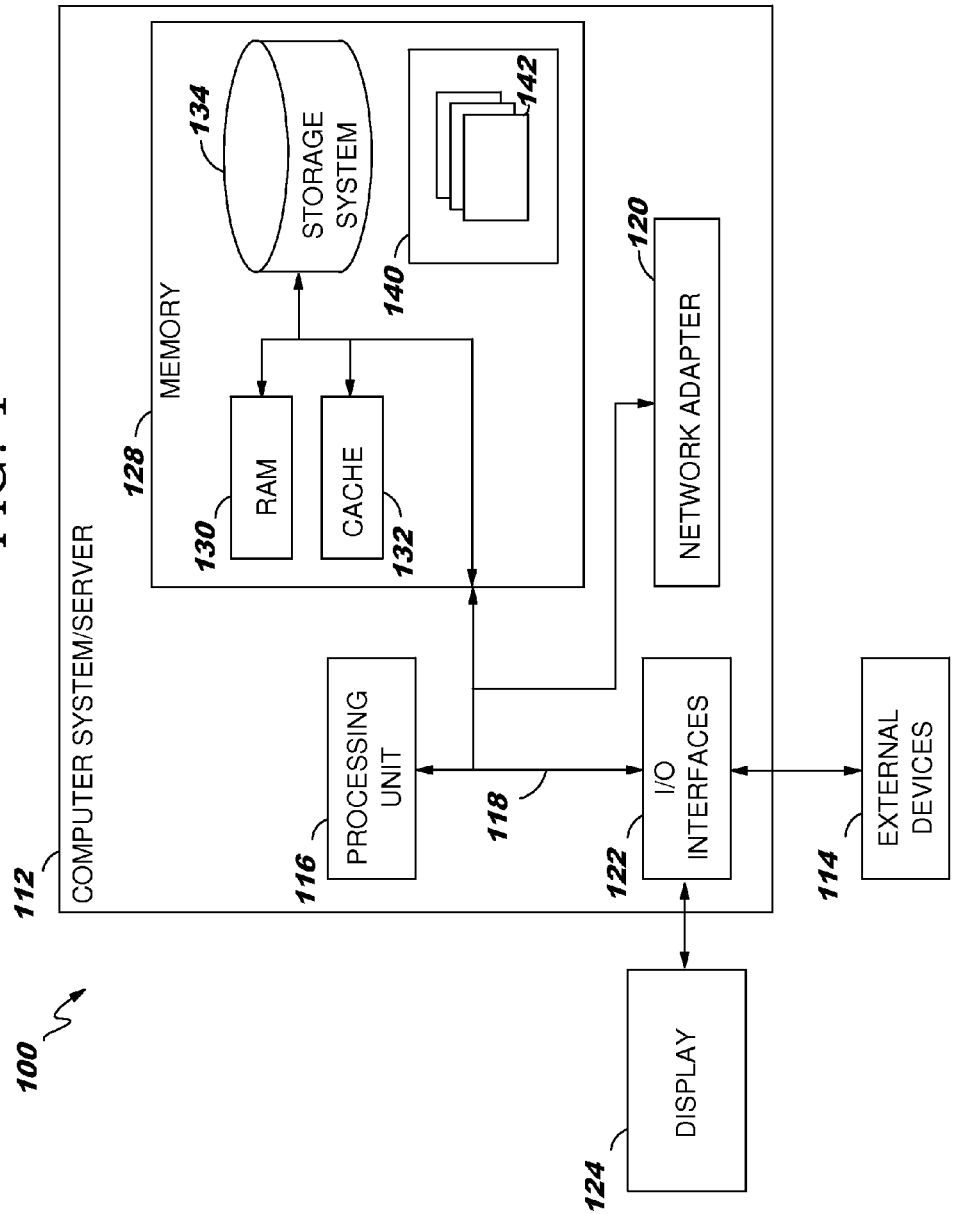
FIG. 1 is a block diagram of a data processing system in which various embodiments may be implemented.

FIG. 1 is a block diagram of a data processing system in which various embodiments may be implemented. Data processing system 100 is only one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, information may be displayed and then securely erased or stored by a program module.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
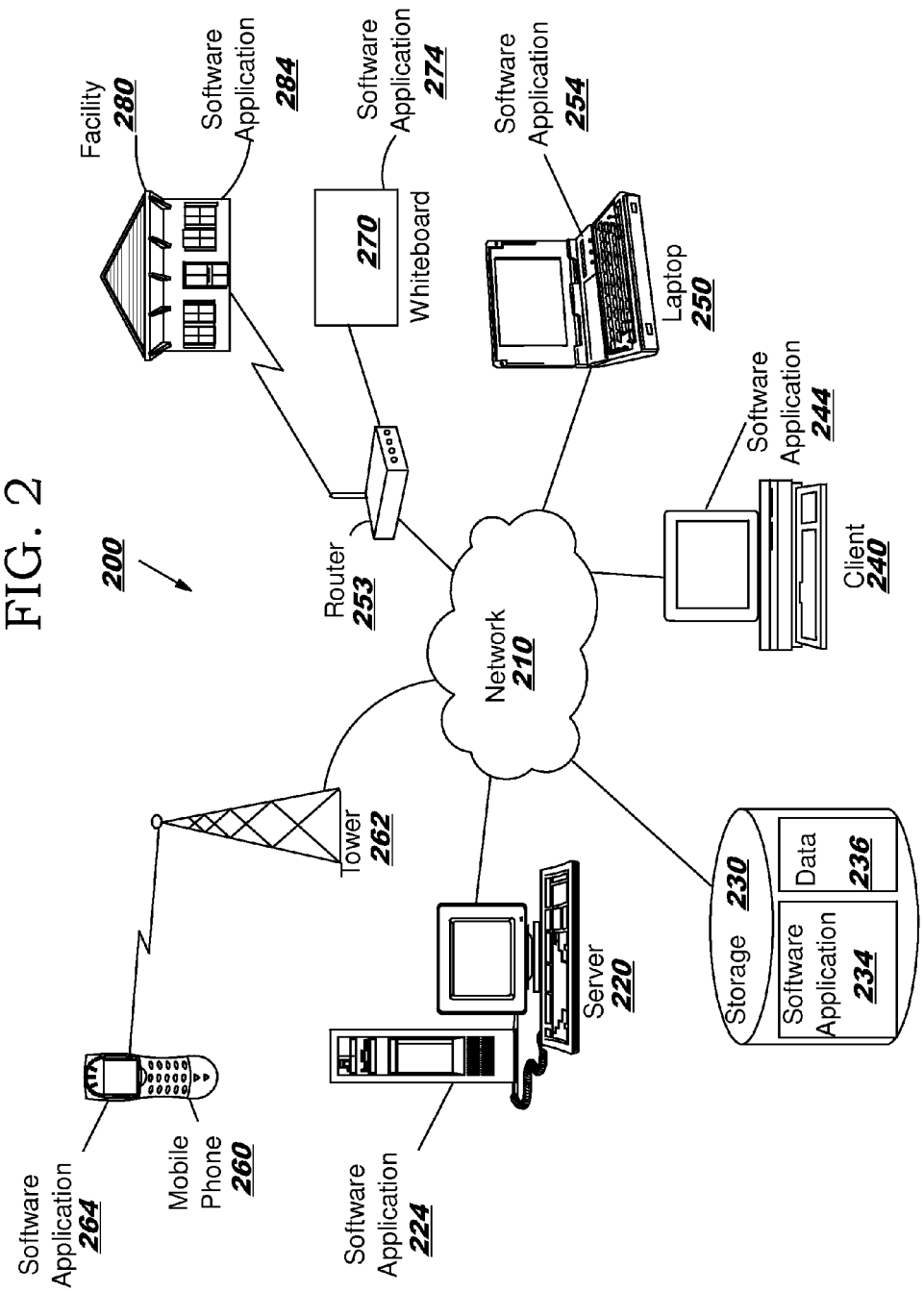
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250, electronic whiteboard 270 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260, whiteboard 270 and facility 280 contain data and have software applications including software tools executing thereon. Other types of data processing systems such as personal digital assistants (PDAs), smartphones, tablets and netbooks may be coupled to network 210.

Server 220 may include software application 224 such as for displaying information and then securely storing or erasing such information or other software applications in accordance with embodiments described herein. Storage 230 may contain software application 234 and a content source such as data 236 for securely storing information for display. Other software and content may be stored on storage 230 for sharing among various computer or other data processing devices. Client 240 may include software application 244. Laptop 250, mobile phone 260 and whiteboard 270 may also include software applications 254, 264 and 274. Facility 280 may include software applications 284. Other types of data processing systems coupled to network 210 may also include software applications. Software applications could include a web browser, email, or other software application that can display information and then securely store, transmit and/or erase such information.

Server 220, storage unit 230, client 240, laptop 250, mobile phone 260, whiteboard 270 and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Client 240, laptop 250 and whiteboard 270 may be clients to server 220 in this example. Client 240, laptop 250, mobile phone 260, whiteboard 270 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 3:
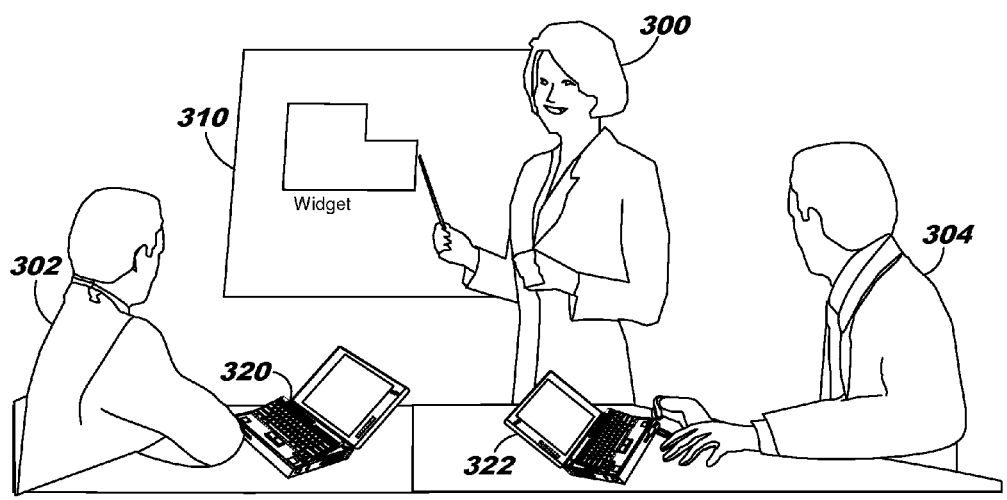
FIG. 3 is a is a diagram of users utilizing a whiteboard in communication with at least one laptop in which various embodiments may be implemented.

FIG. 3 is a diagram of users utilizing a whiteboard in communication with at least one laptop in which various embodiments may be implemented. Shown are three users 300, 302 and 304 discussing and modifying a potential product using an electronic whiteboard 310. The whiteboard is in communication with a laptop 320 and possibly a second laptop 322. Other types of devices, typically mobile devices, may be used in communication with the whiteboard such as smartphones, tablets, etc. In addition, other types of display/input devices may be used instead of a whiteboard including a touch sensitive LCD display. This communication may be a local direct connection such as Bluetooth, near field communications, peer to peer networks over Wi-Fi or other wireless local area networks. In the alternative, the communication may be a common wide area network implemented using a router, cell phone connection, etc. As a user writes information on the electronic whiteboard, that information is temporarily stored at the whiteboard and then periodically conveyed to the laptop(s) for more permanent storage. The laptop(s) periodically provide a signal to the whiteboard so that the whiteboard continues collecting, storing and communication displayed information to the laptop(s). Once the whiteboard does not receive this periodic signal from the laptop(s) indicating the users are no longer present in the room, the whiteboard will erase the information displayed on the whiteboard and erase the stored information from memory. Other methods may be used to determine that the users are no longer present including motion detectors, GPS information relating to the laptop(s), etc. The users may also request the whiteboard to clean its display and memory through their laptop(s).

Figure 4:
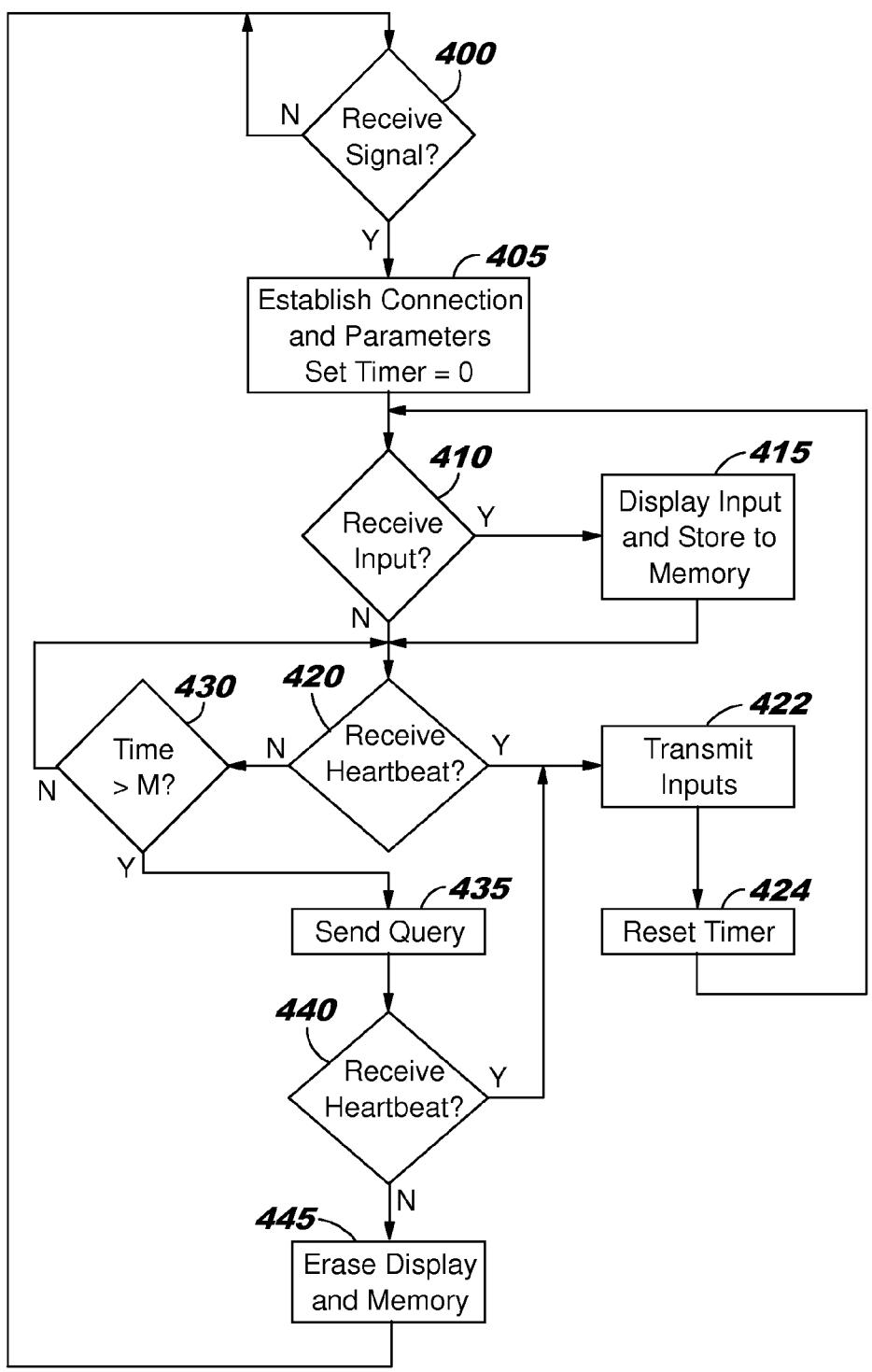
FIG. 4 is a flowchart illustrating the operation of a whiteboard in accordance with a first embodiment.

FIG. 4 is a flowchart illustrating the operation of a whiteboard in accordance with a first embodiment. In a first step 400, the whiteboard determines whether it has received a signal yet. If not, then processing returns to step 400, thereby repeating that process until a signal is received or until the device is turned off. If a signal is received such as from a laptop, then processing continues to step 405 where a session or connection is established between the whiteboard and the laptop and parameters for that connection are also established. This involves establishing whether the communication is encrypted including the key or random number generator utilized for the encryption and whether a password may be used. In the case where the laptop is communicating with the whiteboard across a wide area network, a GPS location may be established to help determine when the laptop is no longer in the same room or locale as the whiteboard. A standard time for the laptop to send periodic signals (referred to herein as heartbeat signals or heartbeats) is established as N and a maximum allowable time for no heartbeat M is also established. This allows the whiteboard to maintain session awareness. That is, the whiteboard is able to determine whether the session is continuing or not. Finally, a whiteboard timer for timing the length of time since the last heartbeat is set to zero.

Processing then continues to step 410 where the whiteboard determines whether it has received some input. This input could include a user writing on the whiteboard using a detectable marker or input provided directly from the laptop for display on the whiteboard. If input is received, then processing continues to step 415 where that input is displayed on the whiteboard if received from the laptop and temporarily stored in the whiteboard's memory. Processing then continues to step 420 after step 415 or if no input was received in step 410.

In step 420, the whiteboard determines whether it has received a heartbeat signal from the laptop indicating that the session is continuing. This heartbeat signal would include an identifier of the laptop and may be encrypted as established in step 405 above. If a heartbeat signal was received, then in step 422 the inputs stored in the whiteboard's memory are transmitted to the laptop for more permanent storage. To improve communication efficiency, perhaps only those changes to the inputs are provided to the laptop. In addition, the update may be only every second, third or other number of heartbeats since the last update sent to the laptop. After step 422, the timer is reset to zero in step 424. Processing then returns to step 410.

If no heartbeat was received in step 420, then in step 430 it is determined whether the length of time since the last heartbeat exceeds M, the maximum allowable time established in step 405 above. If not, then processing returns to step 410. If yes, then in step 435 a query is sent to the laptop notifying the laptop that the maximum allowable time has been exceeded. In step 440, it is determined whether the laptop has responded to the query with another heartbeat communication. If yes, the processing continues to step 422. If not, then the session has ceased so in step 445 the whiteboard erases the information displayed and erases the input data stored in the whiteboard's memory. This then prevents other persons from coming in later and seeing the information previously displayed on the whiteboard. Processing then returns to step 400 where the whiteboard waits until another user arrives and initiates a new session.

FIG. 5 is a flowchart illustrating the operation of a laptop in accordance with a first or second embodiment. In a first step 500, the laptop sends a signal requesting a connection to a whiteboard. The user may initiate this signal by starting a whiteboarding software program. In step 510, the laptop determines whether a response was received. If not, then in step 515 an error message is provided to the user, such as on the laptop's display, and then the program exits until reinitiated by the user. If a response was received, then a session or connection is established between the laptop and the whiteboard including establishing various parameters for that connection. This involves establishing whether the communication is encrypted including the key or random number generator utilized for the encryption and whether a password may be used. In the case where the laptop is communicating with the whiteboard across a wide area network, a GPS location may be established to help determine when the laptop is no longer in the same room or locale as the whiteboard. A standard time for the laptop to send periodic signals (referred to herein as heartbeat signals or heartbeats) is established as N and a maximum allowable time for no heartbeat M is also established. This allows the whiteboard to maintain session awareness. Finally, a laptop timer for timing the length of time since the last heartbeat was sent is set to zero.

Processing then continues to step 530 where it is determined whether the laptop timer is equal to N where N is equal to the agreed time between heartbeats. If not, then in step 535 it is determined whether the whiteboard has sent an inquiry asking whether the laptop is still present. This may have occurred if the whiteboard did not receive the last heartbeat due to interference or other communication issue. If not, then processing returns to step 530 above. If yes to either step 530 or step 535, then processing proceeds to step 540.

In step 540, a heartbeat signal is sent from the laptop to the whiteboard to indicate the session is continuing. This signal can include various parameters and may also be encrypted such as is described with reference to FIG. 6 below. Subsequently, in step 550, it is determined whether the whiteboard responded to the heartbeat by sending some input data to the laptop. If yes, then in step 555 that data is loaded into the laptop's memory. Subsequently, or in the case of no in step 550, the laptop timer is set to 0 in step 560. Processing then returns to step 530 above.

FIG. 6 is a flowchart illustrating the operation of a whiteboard in accordance with a second embodiment. In a first step 600, the whiteboard determines whether it has received a signal yet. If not, then processing returns to step 600, thereby repeating that process until a signal is received or until the device is turned off. If a signal is received such as from a laptop, then processing continues to step 605 where a session or connection is established between the whiteboard and the laptop and parameters for that connection are also established. This involves establishing whether the communication is encrypted including the key or random number generator utilized for the encryption and a password to be used. In the case where the laptop is communicating with the whiteboard across a wide area network, a GPS location may be established to help determine when the laptop is no longer in the same room or locale as the whiteboard. A standard time for the laptop to send periodic signals (referred to herein as heartbeat signals or heartbeats) is established as N and a maximum allowable time for no heartbeat M is also established. This allows the whiteboard to maintain session awareness. That is, the whiteboard is able to determine whether the session is continuing or not. Finally, a whiteboard timer for timing the length of time since the last heartbeat is set to zero.

Processing then continues to step 610 where the whiteboard determines whether it has received some input. This input could include a user writing on the whiteboard using a detectable marker or input provided directly from the laptop for display on the whiteboard. If input is received, then processing continues to step 615 where that input is displayed on the whiteboard if received from the laptop and temporarily stored in the whiteboard's memory. Processing then continues to step 620 after step 615 or if no input was received in step 610.

In step 620, the whiteboard determines whether it has received a signal from another laptop. This may occur if the user that established the initial connection has asked a second (or third) user to join in with receiving inputs and providing a continuing heartbeat. If no such signal is received, then processing proceeds to step 630. If a signal is received, then in step 622 it is determined whether the signal includes the password set forth with the first laptop in step 605. If not, then the signal is ignored and processing proceeds to step 630. If a signal with the correct password is received, then a connection is established with the second laptop including providing the parameters set forth with the first laptop including the type of encryption that may be used for transmitting information across the connection. Processing would then proceed to step 630. In alternative embodiments, additional security procedures may be used to help prevent unauthorized person from gaining access to the ongoing communication with the first laptop.

In step 630, the whiteboard determines whether it has received a heartbeat signal from the laptop(s) indicating the session is continuing. This heartbeat signal would include an identifier of the laptop and may be encrypted as established in step 605 above. If a heartbeat was received, then in step 632 it is determined whether the heartbeat is within range. That is, a GPS or other positional signal is compared to parameters to see if the laptop is within the desired range, such as within the room. These parameters may be set forth in step 605 above or may be set forth by the IT professionals of the enterprise. If not within range, then processing proceeds to step 640. If a heartbeat signal was received and within range, then in step 634 the inputs stored in the whiteboard's memory are transmitted to the laptop for more permanent storage. To improve communication efficiency, perhaps only those changes to the inputs are provided to the laptop. In addition, the update may be only every second, third or other number of heartbeats since the last update sent to the laptop. After step 634, the timer is reset to zero in step 636 and processing then returns to step 610.

If no heartbeat was received in step 630 or if the heartbeat signal was out of range in step 632, then in step 640 it is determined whether the length of time since the last heartbeat exceeds M, the maximum allowable time established in step 605 above. If not, then processing returns to step 610. If yes, then in step 645 a query is sent to the laptop(s) notifying the laptop(s) that the maximum allowable time has been exceeded. In step 650, it is determined whether the laptop(s) has responded to the query with another heartbeat communication. If yes, then the session has ceased so in step 655 it is determined whether the heartbeat was within range. That is, a GPS or other positional signal is compared to parameters to see if the laptop is within the desired range, such as within the room. These parameters may be set forth in step 605 above or may be set forth by the IT professionals of the enterprise. If not within range, then processing proceeds to step 660. If a heartbeat was received and within range, then processing continues to step 634.

In step 660, due to the lack of a heartbeat within range for a period of time, the whiteboard erases the information displayed and erases the input data stored in the whiteboard's memory. This then prevents other persons from coming in later and seeing the information previously displayed on the whiteboard. Processing then returns to step 400 where the whiteboard waits until another user arrives and initiates a new session.

The laptops or other systems communication with the second embodiment of the whiteboard may use the processes set forth in FIG. 5 above. Alternative embodiments may also be utilized such as by including additional security measures to maintain secure communications.

FIG. 7A is a block diagram of a communication that may be sent from the whiteboard to the laptop in accordance with the first or second embodiments. This communication may be encrypted. A first element 700 is an identifier of the whiteboard. This is in case multiple electronic whiteboards may be within the network range of the laptop. A second element 710 is the password used for these communications. This password is to help the laptop verify the sender of the communication. A third element 720 is the input data that the whiteboard has received from the users, such as drawings and erasures made by users on the whiteboard.

FIG. 7B is a block diagram of a heartbeat communication that may be sent from the laptop to the whiteboard in accordance with the first or second embodiments. This communication may be encrypted. A first element 750 is an identifier of the laptop. This is in case multiple laptops may be within the network range of the whiteboard. For example, there may be multiple whiteboards communicating with multiple laptops within the network range of this laptop. A second element is the password 760 used for these communications. This password is to help the whiteboard verify the sender of the communication. A third element 770 is the GPS location of the laptop. This element may be included if the laptop and whiteboard are communicating across a wide area network. This way the whiteboard can determine whether the laptop has left the room where the whiteboard is located.

Various alternative embodiments may be utilized beyond the various embodiments described herein. For example, the laptop may explicitly logoff or otherwise end the session. Upon such an occurrence, the whiteboard may transmit any final inputs to the whiteboard before erasing its display and memory. In another alternative embodiment, a lack of input to the whiteboard for a period of time may indicate that the session has ended even if the laptop is sending a periodic heartbeat. In such as case, the whiteboard may send a query to the laptop to see if the session has ended. If no response, then the whiteboard may erase its display and memory. In another alternative embodiment, the heartbeat signal may be sent only upon a query by the whiteboard. That is, the whiteboard may periodically send a query which the laptop may respond to if the laptop is within range of the whiteboard. This would prevent the laptop from sending heartbeats for a period of time after the session may have ended.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for securing displaying information and then securely storing or erasing such information. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for securing displayed information comprising:
    establishing a shared information session between a first data processing device including a first memory and a second data processing device including a second memory for storing and a display for displaying the shared information;
    maintaining session awareness indicating that both the first and second devices are alive in the session wherein the session awareness is maintained by a heartbeat signal sent at regular periods from the first device to the second device without the first device receiving a second heartbeat signal from the second device;
    inputting displayed information into the second data processing device during the session, including input data received from the first device, producing displayed input information stored in the second memory;
    responsive to the session awareness indicating the session is alive between the first and second device, periodically sharing the displayed input information from the second memory of the second device to the first device for storage in the first memory; and
    responsive to the session awareness indicating the session has ended between the first and second device, deleting the displayed input information in the second memory, wherein the second data processing device is an electronic whiteboard.

2. The method of claim 1 further comprising storing the displayed input information in the first memory, and the displayed input information is maintained in the first memory after the session has ended.

3. The method of claim 1 wherein the second device has a timer for determining whether the heartbeat signal has been interrupted.

4. The method of claim 3 wherein the second device determines whether the first device is within a desired proximity to the second device selected from a group of based on the heartbeat signal from the first device and a positional signal based location of the first device.

5. The method of claim 3 wherein the session includes a password stored in the first device and the second device, the password being utilized in the heartbeat signal to confirm the identity of the first device to the second device.

6. The method of claim 1 wherein the information is selected from a group of input according to user interaction with a surface of the display and input according to communication from the first device.

7. The method of claim 1 wherein the displayed input information is displayed on the display and is erased from the display when the session has ended.

8. The method of claim 1 further comprising storing the displayed input information in the first memory, and the displayed input information is maintained in the first memory after the session has ended; wherein the second data processing device is an electronic whiteboard; wherein the session awareness is maintained by a heartbeat signal sent at regular periods from the first device to the second device; wherein the second device has a timer for determining whether the heartbeat signal has been interrupted; wherein the second device does not send a second heartbeat signal and the first device does not have a timer for timing heartbeat signals; wherein the second device determines whether the first device is within a desired proximity to the second device based on the heartbeat signal and a positional signal based location of the first device; wherein the information is input according to user interaction with a surface of the display; wherein the information is input according to communication from the first device; wherein the session includes a password stored in the first device and the second device, the password being utilized in the heartbeat signal to confirm the identity of the first device to the second device; and wherein the input information is displayed on the display and is erased from the display when the session has ended.

9. A computer usable program product comprising a non-transitory computer usable storage medium including computer usable code for use in securing displayed information, the computer usable program product comprising code for performing the steps of:
    establishing a shared information session between a first data processing device including a first memory and a second data processing device including a second memory for storing and a display for displaying the shared information;
    maintaining session awareness indicating that both the first and second devices are alive in the session wherein the session awareness is maintained by a heartbeat signal sent at regular periods from the first device to the second device without the first device receiving a second heartbeat signal from the second device;
    inputting displayed information into the second data processing device during the session, including input data received from the first device, producing displayed input information stored in the second memory;
    responsive to the session awareness indicating the session is alive between the first and second device, periodically sharing the displayed input information from the second memory of the second device to the first device for storage in the first memory; and
    responsive to the session awareness indicating the session has ended between the first and second device, deleting the displayed input information in the second memory, wherein the second data processing device is an electronic whiteboard.

10. The computer usable program product of claim 9 further comprising storing the displayed input information in the first memory, and the displayed input information is maintained in the first memory after the session has ended.

11. The computer usable program product of claim 9 wherein the second device has a timer for determining whether the heartbeat signal has been interrupted.

12. The computer usable program product of claim 11 wherein the second device determines whether the first device is within a desired proximity to the second device selected from a group of based on the heartbeat signal from the first device and a positional signal based location of the first device.

13. The computer usable program product of claim 11 wherein the session includes a password stored in the first device and the second device, the password being utilized in the heartbeat signal to confirm the identity of the first device to the second device.

14. The computer usable program product of claim 9 wherein the information is selected from a group of input according to user interaction with a surface of the display and input according to communication from the first device.

15. The method of claim 9 wherein the displayed input information is displayed on the display and is erased from the display when the session has ended.

16. A data processing system for securing displayed information, the data processing system comprising:
- a processor; and
- a memory storing program instructions which when executed by the processor execute the steps of:
  - establishing a shared information session between a first data processing device including a first memory and a second data processing device including a second memory for storing and a display for displaying the shared information;
  - maintaining session awareness indicating that both the first and second devices are alive in the session wherein the session awareness is maintained by a heartbeat signal sent at regular periods from the first device to the second device without the first device receiving a second heartbeat signal from the second device;
  - inputting displayed information into the second data processing device during the session, including input data received from the first device, producing displayed input information stored in the second memory;
  - responsive to the session awareness indicating the session is alive between the first and second device, periodically sharing the displayed input information from the second memory of the second device to the first device for storage in the first memory; and
  - responsive to the session awareness indicating the session has ended between the first and second device, deleting the displayed input information in the second memory, wherein the second data processing device is an electronic whiteboard.

17. The data processing system of claim 16 further comprising storing the displayed input information in the first memory, and the displayed input information is maintained in the first memory after the session has ended.

18. The data processing system of claim 16 wherein the second device has a timer for determining whether the heartbeat signal has been interrupted.

19. The data processing system of claim 18 wherein the second device determines whether the first device is within a desired proximity to the second device selected from a group of based on the heartbeat signal from the first device and a positional signal based location of the first device.

20. The data processing system of claim 18 wherein the session includes a password stored in the first device and the second device, the password being utilized in the heartbeat signal to confirm the identity of the first device to the second device.

21. The data processing system of claim 16 wherein the information is selected from a group of input according to user interaction with a surface of the display and input according to communication from the first device.

22. The data processing system of claim 16 wherein the displayed input information is displayed on the display and is erased from the display when the session has ended.

\* \* \* \* \*